United States Patent

Kato et al.

[11] Patent Number: 5,972,394
[45] Date of Patent: Oct. 26, 1999

[54] METHOD OF PREPARING A FERMENTED SOYBEAN MILK AND FERMENTED SOYBEAN MILK

[75] Inventors: Takako Kato; Daisuke Inoue; Kyoko Kobayashi, all of Okazaki, Japan

[73] Assignee: Murusan-Ai Co. Ltd., Okazaki, Japan

[21] Appl. No.: 09/124,847

[22] Filed: Jul. 30, 1998

[30] Foreign Application Priority Data

Jul. 31, 1997 [JP] Japan .................................. 9-220175

[51] Int. Cl.$^6$ .............................. A23C 9/12; A23L 1/211; C12H 3/00
[52] U.S. Cl. ................................. 426/46; 426/34; 426/14; 426/634
[58] Field of Search .................................. 426/46, 34, 14, 426/62, 634

[56] References Cited

U.S. PATENT DOCUMENTS

| | | | |
|---|---|---|---|
| 4,855,148 | 8/1989 | Kuribayashi et al. | 426/46 |
| 5,817,359 | 10/1998 | Michaels et al. | 426/425 |
| 5,824,223 | 10/1998 | Michaels et al. | 210/642 |

FOREIGN PATENT DOCUMENTS

| | | |
|---|---|---|
| 51-19191 | 2/1976 | Japan . |
| 52-96797 | 8/1977 | Japan . |
| 55-19023 | 2/1980 | Japan . |
| 59-132855 | 7/1984 | Japan . |
| 59-227241 | 12/1984 | Japan . |
| 62-155076 | 7/1987 | Japan . |

*Primary Examiner*—Keith D. Hendricks
*Attorney, Agent, or Firm*—Armstrong, Westerman, Hattori, McLeland & Naughton

[57] ABSTRACT

A method of preparing a fermented soybean milk comprising subjecting a soybean milk to fermentations with yeast and lactic acid bacteria, and subjecting the resulting fermented soybean milk to a deactivation treatment to deactivate the yeast and bacteria by heating and a removal treatment to remove alcohol and carbon dioxide gas contained therein. As a result, a fermented soybean milk which is a beverage suiting everybody's taste, and a packed product thereof which is not subject to expansion or deformation during storage, are obtained.

6 Claims, No Drawings

METHOD OF PREPARING A FERMENTED SOYBEAN MILK AND FERMENTED SOYBEAN MILK

FIELD OF THE INVENTION

The present invention relates to a method of preparing a fermented soybean milk and to a fermented soybean milk.

BACKGROUND OF THE INVENTION

Hitherto, it has been disclosed, for example, in JP-A-55 19023 and JP-A-59 227241, that a lactic fermented soybean milk is prepared by fermentation of a soybean milk with lactic acid bacteria, but that this product has a grassy smell, in other words, a bean smell, which presents a problem for a lactic fermented soybean milk beverage.

On the other hand, it has been disclosed, for example, in JP-A-59 132855, JP-A-62 155076, that for removing the grassy smell and improving the flavor of the fermented soybean milk, a soybean milk obtained by heating soybeans or puverized soybeans to deactivate lipoxygenases contained therein, is either as it is, or with sugars added, subjected to an alcoholic fermentation and a lactic acid fermentation using yeasts and lactic bacteria, to prepare, on the one hand, a lactic fermented acid beverage containing a comparatively small amount of alcohol, and on the other hand, a lactic fermented soybean milk containing a comparatively large amount of alcohol, that is, a fermented soybean milk liquor.

These products are free of the grassy smell and have a good flavor as a result of the synergy between the alcoholic fermentation and the lactic acid fermentation.

Thus, these converted alcohol-containing lactic acid beverages as mentioned above have been improved in smell and taste because of the absence of grassy smell. However, since, not only they contain a foaming carbon dioxide gas, but also, the lactic fermented beverage containing a comparatively small amount of alcohol contains ordinarily about 0.1–3% of alcohol, and the lactic fermented liquor contains 7–8% of alcohol, they bring about inconveniences such as those listed below.

1) They are not beverages suitable for everybody, because they contain alcohol.

2) Since they contain carbon dioxide gas, filling a container with these beverages is difficult. In particular, when some sugar remains in the fermented soybean milk or in the case any additives such as sugars are added to the fermented soybean milk after completion of the fermentation treatment in order to prepare a blended fermented soybean milk product, fermentations caused by live yeasts and lactic acid bacteria take place, so that the amounts of alcohol and carbon dioxide gas are increased, and the qualities of the products are changed. In addition, especially when easily deformable sealed containers, such as packages made of paper or pulp, are used, deformation and expansion of the packed products take place during storage.

3) The amount of carbon dioxide gas dissolved in the fermented soybean milk varies with the temperature, and the amount of the fermented soybean milk in the filled container varies with the temperature, so that packaged products equal in content quality and volume cannot be obtained.

4) When no sugars are present in the fermented soybean milk, or when the remaining sugar has been eaten up by the yeast, autolysis of the live yeast in the fermented soybean milk begins and proteolytic enzymes in the cells of the yeast react with the protein in the soybean milk to product a bitter substance, so that the quality of the product deteriorates at the time of preparation thereof and is further lowered during storage.

Accordingly, a method is desired for preparing a fermented soybean milk which is free from the above-listed inconveniences and has the advantages that it does not contain any alcohol so as to suit everybody's taste, it is always even in quality, and it can be used to fill a container easily to obtain a packaged product which does not contain alcohol, carbon dioxide gas, or a bitter substance, so that it is not subject to expansion and deformation during storage, and thus, is stable and has an excellent shelf life.

SUMMARY OF THE INVENTION

The present invention provides a method of preparing a fermented soybean milk which eliminates the above-mentioned inconveniences and satisfies the above-mentioned goals, in that it comprises subjecting a soybean milk, optionally with at least one kind of sugar added, to an alcoholic fermentation and a lactic acid fermentation using at least one species of yeasts and at least one species of lactic acid bacteria, and subjecting the resulting fermented soybean milk to a deactivation treatment of the yeast and lactic acid bacteria and to a removal treatment of alcohol and carbon dioxide gas. Further, the present invention provides a method of preparing a fermented soybean milk which can be carried out economically and with a high efficiency, wherein the amount of the sugar or sugars added to the soybean milk is 1 wt. % or less based on the dry matter of the soybean milk. Furthermore, the present invention provides a method of preparing a fermented soybean milk which can be carried out smoothly and with a high efficiency, wherein, after the fermented soybean milk is subjected to the deactivation treatment of the yeast and bacteria by heating, the heated fermented soybean milk is subjected to the removal treatment of alcohol and carbon dioxide gas under reduced pressure. Furthermore, the invention provides a convenient method of preparing a fermented soybean milk, wherein the alcoholic fermentation treatment and the lactic acid fermentation treatment may be carried out simultaneously or separately one after the other.

Furthermore, the present invention provides a fermented soybean milk which suits everybody's taste, has a good shelf life, is not changed in quality even after a container has been filled with it and hermetically sealed, does not subject the packed product to expansion or deformation, and does not substantially contain alcohol and carbon dioxide gas.

DESCRIPTION OF THE PREFERRED EMBODIMENT

Preferred embodiments of the present invention will be explained in detail as follows.

As for the soybeans used as raw materials, any kind may be used, including defatted beans.

In order to prevent generation of the grassy smell, the soybeans are heated to 80° C. or higher by a wet heating process or a dry heating process before they are ground, or at the time of grinding, they are ground together with hot water at 80° C. or higher, or any other means is employed, so as to thermally decompose lipoxygenases contained in the soybeans to prevent their activity, and to obtain a soybean milk which does not have a grassy smell, that is, a bean smell.

Next, the soybean milk, as it is, or with at least one kind of sugar added, is subjected to an alcoholic fermentation and a lactic acid fermentation with at least one kind of yeast fungi and at least one kind of lactic acid bacteria inoculated therein. During the fermentations, various substances including alcohol, carbon dioxide gas, and lactic acid, are produced, and the flavor and taste are simultaneously improved so as to obtain a fermented soybean milk which has a good flavor and a good taste.

As for the added sugars, it is sufficient if they are fermentable sugars such as glucose, cane sugar, maltose, galactose, raffinose, and one kind or more thereof may be added. Although any limitation should be determined according to each particular case, it is preferably to limit the amount of sugars added to about 1.0 wt. % based on the dry matter of the soybean milk in order to prepare economically and with a high efficiency a fermented soybean milk which is free of alcohol and carbon dioxide gas and suits everybody's taste.

The reasons why such a limitation on the amount of added sugars is made are explained in detail as follows. When the soybean milk is fermented using both the yeast and lactic acid bacteria, it is sufficient, in order to obtain a fermented soybean milk which is improved in smell and taste, if the content in alcohol produced in the fermented soybean milk is less than 0.4%. In order to perform such an alcoholic fermentation, it is sufficient if the amount of sugar added is less than 1.0%. In addition, since the present invention is not aimed at preparing a lactic fermented liquor, an amount of sugar added exceeding 1.0% is not necessary and is rather not preferable, because it increases the production of alcohol, which renders the removal treatment uneconomical, and which makes it impossible to remove alcohol with a high efficiency in a short period of time, resulting in an incomplete removal of alcohol. As a result, a fermented soybean milk having an alcohol smell tends to be produced, which is not preferable.

The soybean milk thus obtained is sterilized by heating. As for the heating sterilization, a high pressure heating sterilization, a UHT (Ultra High Temperature) heating sterilization or the like can be considered, but in order to prevent thermal discoloration and a scorched-like smell of the soybean milk, the UHT heating sterilization is preferable. The soybean milk is sterilized, for instance, at 130° C. for one second by the UHT heating. Next, the soybean milk thus sterilized, as it is, or with a proper amount of sugar or sugars added, is inoculated with any yeast fungi and any lactic acid bacteria, and is subjected to the alcoholic fermentation and the lactic acid fermentation.

As for the yeast fungi to be inoculated, there is no limitation as long as they are ethyl-alcohol fermentation yeasts, and *Saccharomyces serevisiae*, a typical species of the Saccharomyces, is suitable.

As for the lactic acid bacteria to be inoculated, there is no special limitation, and bacteria that are used for preparing lactic fermented products of milk are suitable in an ordinary case. An enumeration of suitable lactic acid bacteria includes, for example, *Lactobacillus helveticus, Lacrobacillus bulgaricus, Lacrobacillus casei, Lactobacilllus acidophilus, Streptococcus thermophilus, Lactococcus lactis*, etc, but a combination of *Lactobacillus helveticus* and *Streptococcus thermophilus* is preferable. In general, any yeast and any lactic acid bacteria are previously cultured in a soybean milk or any other suitable culture medium.

The cultured medium of yeasts and the cultured medium of lactic acid bacteria, respectively, are then added to the foregoing sterilized soybean milk to be fermented. In general, the amount of yeast added is preferably about 0.5–1.5wt. % based on the soybean milk, and the amount of lactic acid bacteria added is preferably 0.5–3.0 wt. % based on the soybean milk.

Fermentation conditions may be suitably determined depending on various factors, including, for example, the kinds of yeasts and lactic acid bacteria, the concentration of the soybean milk as raw material, the amount of sugars added, the predetermined acidity of lactic acid in the fermented soybean milk to be prepared, the predetermined alcoholic fermentation degree by yeast fermentation, and, in an ordinary case, the alcoholic fermentation and the lactic acid fermentation are carried out at 20–42° C. for 10–24 hours to prepare a fermented soybean milk. The alcoholic fermentation treatment and the lactic acid fermentation treatment may be carried out simultaneously or separately one after the other.

According to the prior art, the alcohol-containing fermented soybean milk thus prepared, which is free from the grassy smell of the bean and has an improved flavor resulting from the synergy between the alcoholic fermentation and the lactic acid fermentation, is thus immediately used, as it is, to fill a container such as a bottle, a can, a paper container, so as to be made into a packed product, or, after it is blended with one kind or more of various additives such as seasoning agents, it is used to fill a container which is subsequently sealed, so as to be made into a seasoned packed product.

However, such conventional packed products have the above-mentioned various drawbacks.

According to the present invention, in order to eliminate the conventional problems such as those mentioned above, the alcohol-containing fermented soybean milk obtained as above is subjected to a deactivation treatment to stop the biological activity of the yeasts and the lactic acid bacteria and to a removal treatment to remove alcohol and carbon dioxide gas.

The deactivation of the yeasts and the lactic acid bacteria is achieved by heating the alcohol-containing fermented soybean milk at a temperature of 60° C. or higher. When it is heated at the minimum temperature of 60° C., it is necessary to heat it for 30 minutes. When it is heated at a temperature higher than 60° C., it is enough to heat it for a shorter period of time so that the deactivation treatment of the yeasts and lactic acid bacteria can be achieved without generating any thermal deterioration or unpleasant smell.

Next, the alcohol-containing fermented soybean milk, which is maintained at a temperature of above 60° C. after being subjected to the deactivation of the yeasts and lactic acid bacteria as mentioned above, is immediately subjected to a removal treatment to remove alcohol and carbon dioxide gas as much as possible. The removal treatment of alcohol and carbon dioxide gas can be achieved by placing the alcohol-containing fermented soybean milk in a tank and heating it, but this requires a long period of time and is inefficient and uneconomical because the soybean milk has strong foam stabilizing characteristics. Therefore, the removal treatment by pressure reduction, that is, by vacuum, is preferable. Due to the high temperature of 60° C. or more and to the reduced pressure, the removal of alcohol and carbon dioxide gas can be achieved easily, rapidly, and with a high efficiency.

However, even if the temperature of the alcohol-containing fermented soybean milk becomes lower than 60° C., the removal of alcohol and carbon dioxide gas can nevertheless be achieved and the purpose of the present invention can be attained.

As for the removal of alcohol and carbon dioxide gas by heating under reduced pressure, the alcohol-containing fermented soybean milk is, for instance, contained in a hermetically sealed container connected to a vacuum system such as a vacuum pump and is heated under reduced pressure, or the alcohol-containing fermented soybean milk is heated and is then spouted or jetted into the closed space under reduced pressure, or any other suitable means may be used. In order to carry out in succession the heating treatment and the suction treatment under reduced pressure, a combined use of a UHT sterilizer and a vacuum chamber is preferable. To give a concrete example, when fermented soybean milk containing 0.3–1.0% of lactic acid, 0.1–0.4% of ethyl alcohol and a small amount of carbon dioxide gas is heated at 120° C. for about 10 seconds in the UHT sterliizer, and is subsequently spouted into the vacuum chamber connected to the UHT sterilizer, the alcohol and carbon dioxide gas contained therein are released and removed to the outside of the vacuum chamber by vacuum suction, and the content of alcohol in the fermented soybean milk becomes less than 0.1%, so that a soybean milk is prepared from which alcohol and carbon dioxide gas have been substantially removed, and which has neither a touch of alcohol flavor nor a lactic acid taste and, subsequently, suits everybody's taste.

Further, it has been found that even when alcohol has been removed from the fermented soybean milk according to the present invention, a fermented soybean milk is obtained which has an improved taste and flavor because it still retains the good flavor and taste, peculiar to a fermented product, which result from the alcoholic fermentation and the lactic acid fermentation. Further, it has been found that the resulting fermented soybean milk contains 0.3–1.0 wt. % of lactic acid, which content is the same as before the foregoing removal treatment, and that the resulting fermented soybean milk suits everybody's taste. Further, it has been confirmed that, even when a container is filled with the fermented soybean milk thus obtained and is heated, neither evaporation of alcohol nor bubbling of carbon dioxide gas occur, and in sensor tests conducted on the fermented soybean milk, no alcohol smell and taste and no carbonic acid smell and taste have been recognized.

Since the fermented soybean milk, after completion of the deactivation treatment of the yeasts and the lactic acid bacteria and the removal treatment of alcohol and carbon dioxide gas, contains no carbon dioxide gas, the work of filling a container with it is facilitated, and each container can be filled with an equal amount. This eliminates the inconvenience that arose when the amount filled varied with the amount of carbon dioxide gas contained. Further, even when a container of the packed product is made of paper, for instance, deformation and expansion of the packed product are not observed during storage or reservation, and a good and stable paper-packed product can be obtained with certainty.

On the other hand, since the yeasts and lactic acid bacteria have been deactivated, when some of the sugar or sugars added to the soybean milk remains, no production of alcohol or production of carbon dioxide gas by yeast can occur during storage, regardless of environmental temperatures, so that a fermented soybean milk packed product is obtained which is free of alcohol and carbon dioxide gas, is stable in quality, and constant in filling amount. On the contrary, when a paper container was filled with a conventional alcohol-containing fermented soybean milk, which contained the same amount of sugar but had not been subjected to the heating deactivation treatment, the container was then sealed to obtain a packed product, and the packed product was stored at 10° C. for three days, an alcoholic fermentation took place, the contents in alcohol and carbon dioxide gas increased, the alcohol content reached 0.2–0.7 wt. %, and thus, the quality of the product was changed, a fermented soybean product with stable qualities was not obtained, and in addition, it was observed that the packed product was deformed and expanded, and when the product was heated, the bubbling of carbon dioxide gas was observed.

Furthermore, in a case where a conventional fermented soybean product, which had not been subjected to the deactivation treatment, contained no sugar, the autolysis of the yeasts and the lactic acid bacteria began and proteases contained therein reacted with the protein of the soybean milk to produce a bitter substance, so that the quality of the product deteriorated to result in a poor product. On the contrary, according to the present invention, autolysis in the fermented soybean milk subjected to the deactivation treatment does not occur to begin with, so that the production of the bitter substance is prevented, ensuring the preparation of a fermented soybean milk product which retains a good flavor and a stable and good quality for a long time during storage.

According to the present invention, the fermented soybean milk thus prepared is, as it is, used to fill a container and packed to obtain a marketable product, or if desired, it is blended with one kind or several kinds of conventional additives, such as sweetening agents, fruit juices, sour agents, or other kinds of seasoning agents, stabilizers, perfumes, coloring agents, so that a fermented soybean milk product with a good flavor, smell, or taste is prepared, and is thereafter packed to obtain a blended and seasoned marketable product.

EMBODIMENT EXAMPLES

Examples of embodiments of the present invention will now be explained in detail, together with comparative examples, as follows. All percentages recited below are percentages by weight unless otherwise stated.

EXAMPLE 1

140 kg of soybeans, after their hulls were removed, were fed continuously into a steamer set at 0.3 kg/cm$^2$ so as to deactivate lipoxygenases contained in the soybeans by heating, 880 liters of hot water at 80° C. were added continuously to the deactivated soybeans, and the soybeans with the hot water added were then ground continuously by a commercial grinder. The resulting slurry was filtered continuously by a commercial centrifugal separator—in this case a screw decanter—to separate residual substances, so that 850 liters of soybean milk were obtained. 5.5 kg of glucose were then added to the soybean milk thus obtained, and the soybean milk with glucose added was sterilized at 130° C. for ten seconds by a UHT sterilizer. The sterilized soybean milk was cooled to 38° C. and 17 liters of a mixed lactic acid bacteria starter, containing substantially no residual sugar and composed to *Streptococcus thermophilus*, a RIFY 5053 strain, and *Lactobacillus helveticus*, a RIFY 5055 strain, which were previously cultured in a soybean milk with glucose added, and 0.85 liter of a yeast starter, containing substantially no sugar and composed of *Saccharomyces serevisiae*, a RIFY 1044 strain, which was previously cultivated in a soybean milk with glucose added, were then added to the sterilized soybean milk, and the mixture was fermented at 38° C. for 15 hours in a fermentation tank. The lactic acid content in the fermented soybean milk at the end of the fermentation was 0.175%, the alcohol content was 0.3%, the residual sugar content was 0.15%, and the fermented soybean milk contained carbon dioxide gas. The fermented soybean milk was then immediately heated at 125° C. for 10 seconds to stop the fermentations and at the same time stop the biological activity of the yeasts and lactic acid bacteria. The fermented soybean milk having such a high temperature was immediately spouted into a vacuum chamber set at a vacuum degree of 200 mmHg and the alcohol and carbon dioxide gas were evacuated by suction to the outside of the vacuum chamber. The lactic acid content in the fermented soybean milk thus obtained was 0.71%, the alcohol content was 0.08%, the residual sugar content was 0.15%, and the fermented soybean milk thus obtained contained no carbon dioxide gas. After the fermented soybean milk free of alcohol and carbon dioxide gas was cooled to room temperature, it was used to fill in sequence each of a number of standing pouches made of laminated aluminum and pulpsheet, which were then hermetically sealed, and thus, a number of fermented soybean packed products were obtained.

COMPARATIVE EXAMPLE 1

The same process as that described in Example 1 was carried out except for the step in Example 1 in which the soybean milk was subjected to the deactivation treatment at 125° C. for 10 seconds and was then immediately spouted into the vacuum chamber set at a vacuum degree of 200 Hgmm to remove alcohol and carbon dioxide gas by suction to the outside of the vacuum chamber. The lactic acid content at the end of the fermentations was 0.75%, the alcohol content was 0.30%, the residual sugar content was 0.15%, and the fermented soybean milk thus prepared contained carbon dioxide gas and had a carbonic acid taste. This fermented soybean milk was immediately used to fill in sequence each of a number of standing pouches made of laminated aluminum and pulpsheet, which were then hermetically packed, so that a number of fermented soybean milk packed products were obvious.

For the product 1 of the present invention prepared in Example 1 and the comparative product 1 prepared in Comparative Example 1, a sensor evaluation was carried out as follows. Twelve panelists evaluated whether the products had a bean smell, a bitter taste, an alcohol smell and taste, and a carbonic acid taste, according to a 3-point evaluation system, with 3 points indicating a maximum, and the evaluation of each product was calculated as the average of the points given by the twelve panelists. Further, a global evaluation of the taste of each product as a soybean milk beverage was made according to a 5-point evaluation system, with 5 points indicating a maximum, and the evaluation of each product was calculated as the average of the points given by the twelve panelists. The results of the evaluations are shown in TABLE 1 below.

TABLE 1

| | Bean smell | Bitter taste | Alcohol smell and taste | Carbon acid taste | Total |
|---|---|---|---|---|---|
| Product 1 of the present invention | 2.8 | 3.0 | 3.0 | 3.0 | 4.8 |
| Comparative product 1 | 2.8 | 3.0 | 1.0 | 1.0 | 2.5 |

Particulars of the 3-point system: 3 points: Absolutely no perception
2 points: Slight perception
1 point: Pronounced perception
Particulars of the 5-point system: 5 point: Savory TABLE 1-continued 4 points: Slightly savory
3 points: Ordinary
2 point: Siightly unsavory
1 point: Unsavory Next, the product 1 of the present invention and the comparative product 1 as mentioned above were stored for three days at room temperature. As a result, for the comparative product 1, expansion of the pouches caused by carbon dioxide gas was observed. This is considered to be caused by carbon dioxide gas produced by the alcoholic fermentation generated by live yeasts present in the products. For the respective products after storage, the same sensory evaluations as mentioned above were made by the same twelve panelists as mentioned above. The results of the evaluations are shown in TABLE 2 below.

TABLE 2

| | Bean smell | Bitter tatse | Alcohol smell and taste | Carbon acid taste | Total |
|---|---|---|---|---|---|
| Product 1 of the present invention | 2.8 | 3.0 | 3.0 | 3.0 | 4.8 |
| Comparative product 1 | 2.8 | 1.0 | 1.0 | 1.0 | 1.3 |

As is clear from a comparison of TABLE 2 with TABLE 1, the bitter taste of comparative product 1 increased during storage, and accordingly, the total evaluation was lower. This is supposed to be caused by the fact that, after years and lactic acid bacteria had consumed the residual sugar, their autolysis occurred to produce the bitter substances.

EXAMPLE 2

140 kg of soybeans, after their hulls were removed, were fed continuously into a steamer set at 0.3 kg/cm$^2$ so as to deactivate lipoxygenases contained in the soybeans by heating. 880 liters of hot water at 80° C. were added continuously to the deactivated soybeans, and the soybeans with the hot water added were then ground continuously by a commercial grinder. The resulting slurry was filtered continuously by a commercial centrifugal separator—in this case a screw decanter—to separate residual substances, so the 850 liters of soybean milk were obtained, and the soybean milk, including 0.9% of sugars contained in the soybean itself, was sterilized at 130° C. for ten seconds by a UHT sterilizer. The sterilized soybean milk was cooled to 38° C., and 17 liters of a mixed lactic acid bacteria starter, containing substantially no residual sugar and composed of *Streptococcus thermophilus*, a RIFY 5053 strain, and *Lactobacillus helveticus*, a RIFY 5055 strain, which were previously cultured in a soybean milk with glucose added, and 0.85 liter of a yeast starter, containing substantially no sugar and composed of *Saccharomyces serevisiae*, a RIFY 1044 strain, which was previously cultivated in a soybean milk with glucose added, were added to the sterilized soybean milk, and the mixture was fermented at 38° C. for 15 hours in a fermentation tank. The lactic acid content in the fermented soybean milk at the end of the fermentation was 0.60%, the alcohol content was 0.2%, the residual sugar content was zero, and it was confirmed that carbon dioxide gas was contained in the fermented soybean milk. The fermented soybean milk was them immediately heated at 125° C. for 10 seconds to stop the fermentations and at the same time prevent the biological activity of the yeasts and lactic acid bacteria. The fermented soybean milk having such a high temperature was immediately spouted in a vacuum chamber set at a vacuum degree of 200 mmHg, so that alcohol and carbon dioxide gas were removed by suction to the outside of the vacuum chamber. The lactic acid content in the fermented soybean milk thus obtained was 0.60%, and the alcohol content was 0.06%. After the fermented soybean milk free of alcohol and carbon dioxide gas was cooled to normal room temperature, it was used to fill in sequence each of a number of standing pouches made of laminated aluminum and pulpsheet, which were then hermetically packed, and thus, a number of fermented soybean packed products were obtained.

COMPARATIVE EXAMPLE 2

The same process as that described in Example 2 was carried out except for the step in Example 2 in which the soybean milk was subjected to the deactivation treatment at 125° C. for 10 seconds, and was then immediately spouted into the vacuum chamber set at a vacuum degree of 200 Hgmm to remove alcohol and carbon dioxide gas by suction to the outside of the vacuum chamber. The lactic acid content at the end of the fermentations was 0.6%, the alcohol content was 0.2%, and the residual sugar content was 9%. The fermented soybean milk was then immediately used to fill each of the standing pouches made of laminated aluminum and pulp, which were then hermetically sealed, so that a number of fermented soybean milk package products were obtained.

For the product 2 of the present invention prepared in the foregoing Example 2 and the comparative product 2 prepared in the foregoing Comparative Example 2, sensory evaluations were carried out in the same manner as mentioned above. The results of the evaluations are shown in Table 3 below.

TABLE 3

| | Bean smell | Bitter tatse | Alcohol smell and taste | Carbon acid taste | Total |
|---|---|---|---|---|---|
| Product 1 of the present invention | 2.8 | 3.0 | 3.0 | 3.0 | 4.6 |
| Comparative product 1 | 2.8 | 3.0 | 1.8 | 1.0 | 2.5 |

Next, the product 2 of the present invention and the comparative product 2 as mentioned above were stored for three days at room temperature. For the respective products after storage, the same sensory evaluations as mentioned above were made by the same twelve panelists as mentioned above. The results of the evaluations are shown in TABLE 4 below.

TABLE 4

| | Bean smell | Bitter tatse | Alcohol smell and taste | Carbon acid taste | Total |
|---|---|---|---|---|---|
| Product 1 of the present invention | 2.8 | 3.0 | 3.0 | 3.0 | 4.6 |
| Comparative product 1 | 2.8 | 1.0 | 1.0 | 1.0 | 2.5 |

As is clear from a comparison between TABLE 4 and TABLE 3, the bitter substance content of the comparative product 2 increased remarkably during storage. Consequently, the overall evaluation rating was further reduced. This is supposed to be caused by the fact that, because the product contained no sugar, autolysis of the yeasts and the lactic acid bacteria began immediately, so that the bitter substance was produced.

The fermented soybean milks prepared by carrying out the deactivation treatment of the yeasts and the lactic acid bacteria and the removal treatment of alcohol and carbon dioxide gas as carried out in the foregoing Example 1 and Example 2, constitute, as they are, marketable products, or, if desired, it is also possible to prepare therefrom blended marketable products by adding at least one kind of various additives to the fermented soybean milk products prepared in the foregoing.

EXAMPLE 1 AND EXAMPLE 2

40 kg of cane sugar, 3.5 kg of pectin, and 1 kg of yogurt flavor were added to each of the fermented soybean milk products prepared in Example 1 and Example 2, the mixture was homogenized by a homogenizer, so that a blended and seasoned fermented soybean milk product was prepared, and the mixture was then used to fill suitable containers, which were hermetically packed to obtain packed products.

It was confirmed that these packed products maintained stable and good qualities, not only when they were kept in cold storage, but also when they were kept at room temperature. By contrast, the alcohol-containing fermented soybean milk products prepared in Comparative Example 1 and Comparative Example 2, even when they were made as blended and seasoned fermented soybean milk products prepared in the same manner as mentioned above, were not beverages suiting everybody's taste because of their alcohol smell and taste, their qualities varied during storage, and the production of the bitter substance could not be prevented.

Furthermore, it has been found that when the removal treatment of alcohol was carried out so that the alcohol content of the fermented soybean milk product because 1% or less, preferably 0.09%, a fermented soybean milk product suiting all people was obtained with certainty.

Thus, according to the method of preparing a fermented soybean milk of the present invention, a fermented soybean milk obtained by fermenting a soybean milk with yeast fungi and lactic acid bacteria is subjected to a deactivation treatment of these micro-organisms and to a removal treatment of alcohol and carbon dioxide gas, so that a fermented soybean milk is obtained which suits everybody because it contains no alcohol, and which contains lactic acid and has a fine flavor. In addition, since the fermented soybean milk contains no dioxide gas, all containers can be filled easily with a constant amount, and packed products which are uniform in quantity and quality of the products are obtained. Further, the quality of the product does not vary because of the production of alcohol and carbon dioxide gas during the fermentations with yeasts and lactic acid bacteria, and no bitter substances are produced due to the autolysis of the yeasts and lactic acid bacteria during storage. At the same time, expansion and deformation of the paper contained during storage can be prevented, and thus, a good and stable product is obtained.

In the preparation of the above-mentioned fermented soybean milk according to the present invention, when the amount of sugar or sugars added to the soybean milk is 1 wt. % or less based on dry matter of the soybean milk, the removal treatment of alcohol and carbon dioxide gas can be carried out rapidly and economically, and a fermented soybean milk product is obtained with lower production costs.

Further, in the preparation of the above-mentioned fermented soybean milk according to the present invention, when the heated fermented soybean milk obtained after carrying out the deactivation treatment by heating is placed under reduced pressure, the alcohol and carbon dioxide gas can be removed rapidly and with a high efficiency.

Furthermore, a fermented soybean milk according to the present invention contains substantially no alcohol and no carbon dioxide gas as a result of the above-mentioned deactivation treatment and the alcohol and carbon dioxide gas treatment, it is suitable as a nutrient-rich and delicious lactic fermented beverage suiting everybody, and even if it is stored for a long time, expansion and deformation of a package are not observed and no generation of alcohol, carbon dioxide or bitter substance occurs, resulting in a good, stable packed product.

What is claimed is:

1. A method of preparing a fermented soybean milk comprising subjecting a soybean milk to an alcoholic fermentation and a lactic acid fermentation using at least one species of yeast fungi and at least one species of lactic acid bacteria, subjecting the resulting fermented soybean milk to a deactivation lactic acid bacteria, subjecting the resulting fermented soybean milk to a deactivation treatment by heating at a temperature of 60° C. or higher to deactivate the yeasts and the bacteria, and subjecting the fermented soybean milk after deactivation to a removal treatment to remove alcohol and carbon dioxide gas under reduced pressure while maintaining a temperature of 60° C. or higher.

2. A method of preparing a fermented soybean milk according to claim 1, wherein the total amount of sugar added to the soybean milk is 1 wt. % or less based on the dry matter of the soybean milk.

3. A method of preparing a fermented soybean milk according to claim 1, wherein the alcoholic fermentation and the lactic acid fermentation are carried out simultaneously.

4. A method of preparing a fermented soybean milk according to claim 1, wherein the alcoholic fermentation and the lactic acid fermentation are carried out separately one after the other.

5. A fermented soybean milk containing lactic acid and containing alcohol in an amount of less than 0.1 wt. % and no carbon dioxide gas.

6. A method of preparing a fermented soybean milk according to claim 1, wherein at least one kind of sugar is added to said soybean milk before subjecting said soybean milk to said alcoholic fermentation and said lactic acid fermentation.

* * * * *